(12) United States Patent
Shi et al.

(10) Patent No.: US 8,619,533 B1
(45) Date of Patent: Dec. 31, 2013

(54) HOLOGRAPHIC DATA STORAGE MEDIUM AND AN ASSOCIATED METHOD THEREOF

(75) Inventors: Xiaolei Shi, Schenectady, NY (US); John Anderson Fergus Ross, Niskayuna, NY (US); Victor Petrovich Ostroverkhov, BallstonLake, NY (US); Juan Jose Becerra, Altamont, NY (US)

(73) Assignee: General Electric Company, Niskyuna, NY (US)

( * ) Notice: Subject to any disclaimer, the term of this patent is extended or adjusted under 35 U.S.C. 154(b) by 0 days.

(21) Appl. No.: 13/562,522

(22) Filed: Jul. 31, 2012

(51) Int. Cl.
*G11B 7/00* (2006.01)

(52) U.S. Cl.
USPC .......................................................... 369/103

(58) Field of Classification Search
USPC .......................................................... 369/103
See application file for complete search history.

(56) References Cited

U.S. PATENT DOCUMENTS

| | | | | |
|---|---|---|---|---|
| 5,056,080 | A * | 10/1991 | Russell | 369/100 |
| 6,310,850 | B1 * | 10/2001 | Sochava et al. | 369/103 |
| 6,322,933 | B1 * | 11/2001 | Daiber et al. | 430/2 |
| 7,307,769 | B2 * | 12/2007 | Ogasawara | 359/24 |
| 7,453,791 | B2 * | 11/2008 | Ogasawara et al. | 369/275.4 |
| 7,738,152 | B2 | 6/2010 | Butler et al. | |
| 8,050,166 | B1 * | 11/2011 | Ross et al. | 369/103 |
| 8,064,313 | B2 * | 11/2011 | Horinouchi et al. | 369/103 |
| 8,084,168 | B2 * | 12/2011 | Wu et al. | 430/1 |
| 8,107,333 | B2 | 1/2012 | Ross et al. | |
| 8,139,461 | B2 * | 3/2012 | Inoue et al. | 369/103 |
| 8,154,975 | B1 * | 4/2012 | Wang et al. | 369/103 |
| 8,194,520 | B2 | 6/2012 | Shi et al. | |
| 8,233,368 | B2 | 7/2012 | Ross et al. | |
| 8,238,217 | B2 | 8/2012 | Ross et al. | |
| 8,345,334 | B2 | 1/2013 | Shi et al. | |
| 2003/0235136 | A1 * | 12/2003 | Akselrod et al. | 369/108 |
| 2005/0219986 | A1 * | 10/2005 | Shimada et al. | 369/94 |
| 2009/0003179 | A1 * | 1/2009 | Bates et al. | 369/103 |
| 2009/0142672 | A1 | 6/2009 | Yamada | |
| 2010/0008206 | A1 | 1/2010 | Jeong | |
| 2010/0157757 | A1 * | 6/2010 | Ross et al. | 369/47.17 |
| 2010/0157773 | A1 * | 6/2010 | Welles et al. | 369/103 |
| 2010/0157776 | A1 * | 6/2010 | Ren et al. | 369/103 |
| 2010/0165816 | A1 | 7/2010 | Ostroverkhov et al. | |
| 2010/0165818 | A1 | 7/2010 | Ostroverkhov et al. | |
| 2011/0080823 | A1 * | 4/2011 | Watkins et al. | 369/275.1 |
| 2011/0096653 | A1 * | 4/2011 | Mizuyama et al. | 369/103 |
| 2011/0235484 | A1 * | 9/2011 | Horigome | 369/44.33 |
| 2011/0273973 | A1 * | 11/2011 | Ross et al. | 369/47.19 |
| 2012/0002519 | A1 * | 1/2012 | Horigome | 369/44.39 |
| 2012/0092976 | A1 * | 4/2012 | Urakawa | 369/44.14 |
| 2012/0092979 | A1 * | 4/2012 | Wang et al. | 369/103 |
| 2012/0092980 | A1 | 4/2012 | Ostroverkhov et al. | |
| 2012/0170437 | A1 * | 7/2012 | Hershey et al. | 369/103 |
| 2012/0182851 | A1 * | 7/2012 | Saito et al. | 369/111 |

FOREIGN PATENT DOCUMENTS

| | | |
|---|---|---|
| EP | 2423917 A2 | 2/2012 |
| JP | 2007079438 A | 3/2007 |
| WO | 2006136968 A1 | 12/2006 |

* cited by examiner

*Primary Examiner* — Brenda Bernardi
(74) *Attorney, Agent, or Firm* — Scott J. Asmus

(57) ABSTRACT

A method implemented using a data recording system is disclosed. The method includes receiving a micro-holographic data storage medium comprising a micro-hologram track having a first cross-sectional area. The method further includes recording a data in the micro-hologram track to form a data track in the micro-hologram track having a second cross-sectional area smaller than the first cross-sectional area.

26 Claims, 9 Drawing Sheets

HOLOGRAPHIC DATA STORAGE MEDIUM AND AN ASSOCIATED METHOD THEREOF

BACKGROUND

The subject matter disclosed herein generally relates to Holographic Data Storage (HDS) media. More specifically, the embodiments of the present invention relate to techniques associated with preformatting and recording data in micro-holographic data storage media.

Conventional data storage technology employs magnetic and optical data storage devices. Conventional methods involve storing individual bits of data using distinct magnetic or optical changes on a surface of the storage medium.

In a holographic data storage medium, data is stored in volume holograms resulting from the interference of a signal beam and a reference beam. Such a recording technique requires the use of specialized components, such as spatial light modulators and charge coupled detectors with very stringent mechanical tolerances to ensure satisfactory operation. Secondly, the optical drive system required for recording data in volume holographic data storage medium is not backward compatible with conventional DB/DVD/CD optical drive systems.

Another type of holographic data storage medium, known as a micro-holographic data storage medium obviates the above mentioned drawbacks. Such a medium has relaxed tolerances and therefore is easier to manufacture and handle. Also, the micro-holographic storage medium is compatible with conventional BD/DVD/CD optical drive systems. The micro-holographic data storage medium does not require the use of a completely different optical drive system for use, unlike the volume holographic type data storage medium. Typically, the data density on the micro-holographic data storage medium can be increased by the use of an objective lens with higher numerical aperture (NA). However, diffraction efficiency (DE) from a micro hologram (bit) for a beam directed through an objective lens of higher NA, is low. As a consequence, the S/N ratio of the read signal obtained from an objective lens with higher numerical aperture will be low. A beam directed through an objective lens of lower NA increases DE from a micro-hologram, thereby reducing the data density in the storage medium.

BRIEF DESCRIPTION

In accordance with one aspect of the present technique, a method implemented using a data recording system is disclosed. The method includes receiving a micro-holographic data storage medium comprising a micro-hologram track having a first cross-sectional area. The method further includes recording a data in the micro-hologram track to form a data track in the micro-hologram track having a second cross-sectional area smaller than the first cross-sectional area.

In accordance with one aspect of the present systems, a micro-holographic data storage medium is disclosed. The micro-holographic data storage medium includes an inert layer and a functional film disposed overlapping the inert layer. The micro-holographic data storage medium also includes a micro-hologram track having a first cross-sectional area formed in the functional film. The micro-holographic data storage medium further includes a data track having a second cross-sectional area smaller than the first cross-sectional area formed in the micro-hologram track.

In accordance with another aspect of the present technique, a non-transitory computer readable medium encoded with a program to instruct a processing unit is disclosed. The program instructs the processing unit to record a data in a micro-hologram track of a micro-holographic storage medium to form a data track in the micro-hologram track wherein the micro-hologram track has a first cross-sectional area and the data track has a second cross-sectional area smaller than the first cross-sectional area.

DRAWINGS

These and other features and aspects of embodiments of the present invention will become better understood when the following detailed description is read with reference to the accompanying drawings in which like characters represent like parts throughout the drawings, wherein.

Figure 11:
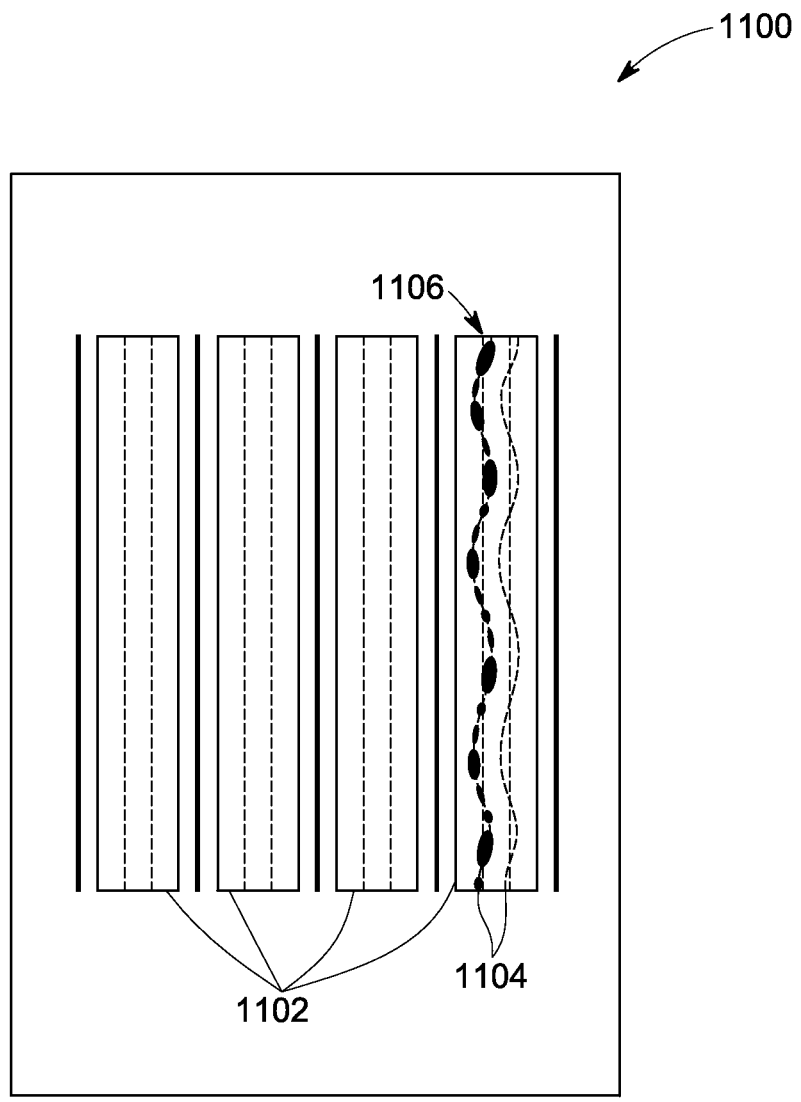
Figure 12:
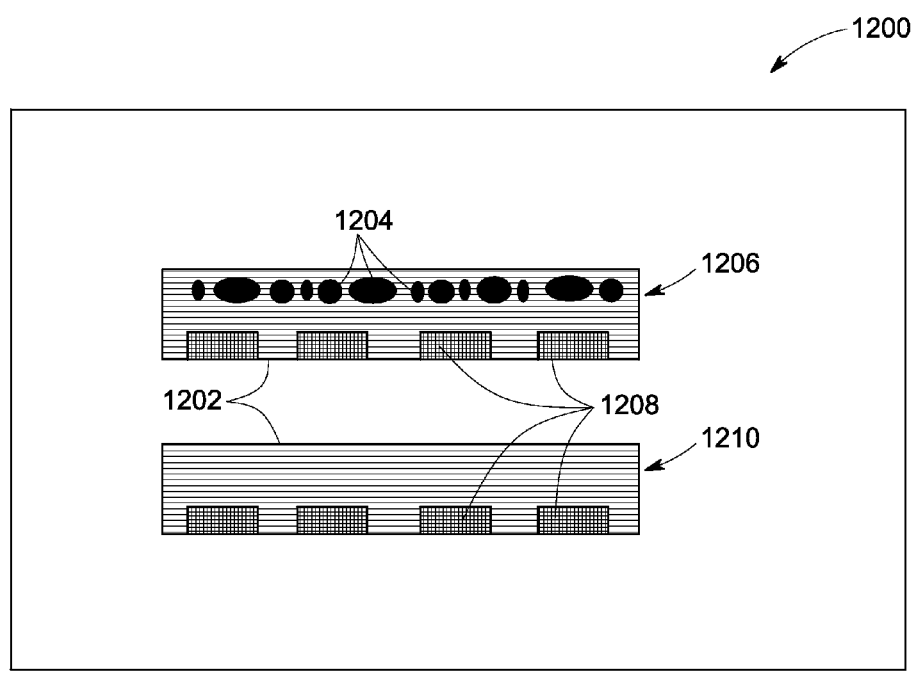

FIG. 11 illustrates a data marking scheme representative of modulated trajectory data tracks formed in a hologram track among a plurality of hologram tracks in accordance with an exemplary embodiment of the present invention; and FIG. 12 illustrates a data marking scheme representative of a data track having meta-data formed in a hologram track among a plurality of hologram tracks, in accordance with an exemplary embodiment of the present invention.

DETAILED DESCRIPTION

Embodiments of the present invention are related to the data storage in a micro-holographic disc (may also be referred to as a "micro-holographic data storage medium"). Specifically, an objective lens of relatively higher numerical aperture (NA) is used to record data in a pre-formatted storage medium having one or more larger size hologram tracks by creating a relatively one or more smaller sized data track in the one or more hologram tracks. Also, specifically an objective lens of relatively lower numerical aperture is used to preformat the storage medium. Various exemplary data marking schemes may be employed to enhance the data density in the pre-formatted storage medium. Use of a lower NA objective lens for pre-formatting enables use of a lower cost pre-formatting system with less stringent system requirements. Use of a higher NA objective lens for recording enables higher data storage capacity.

Figure 1:
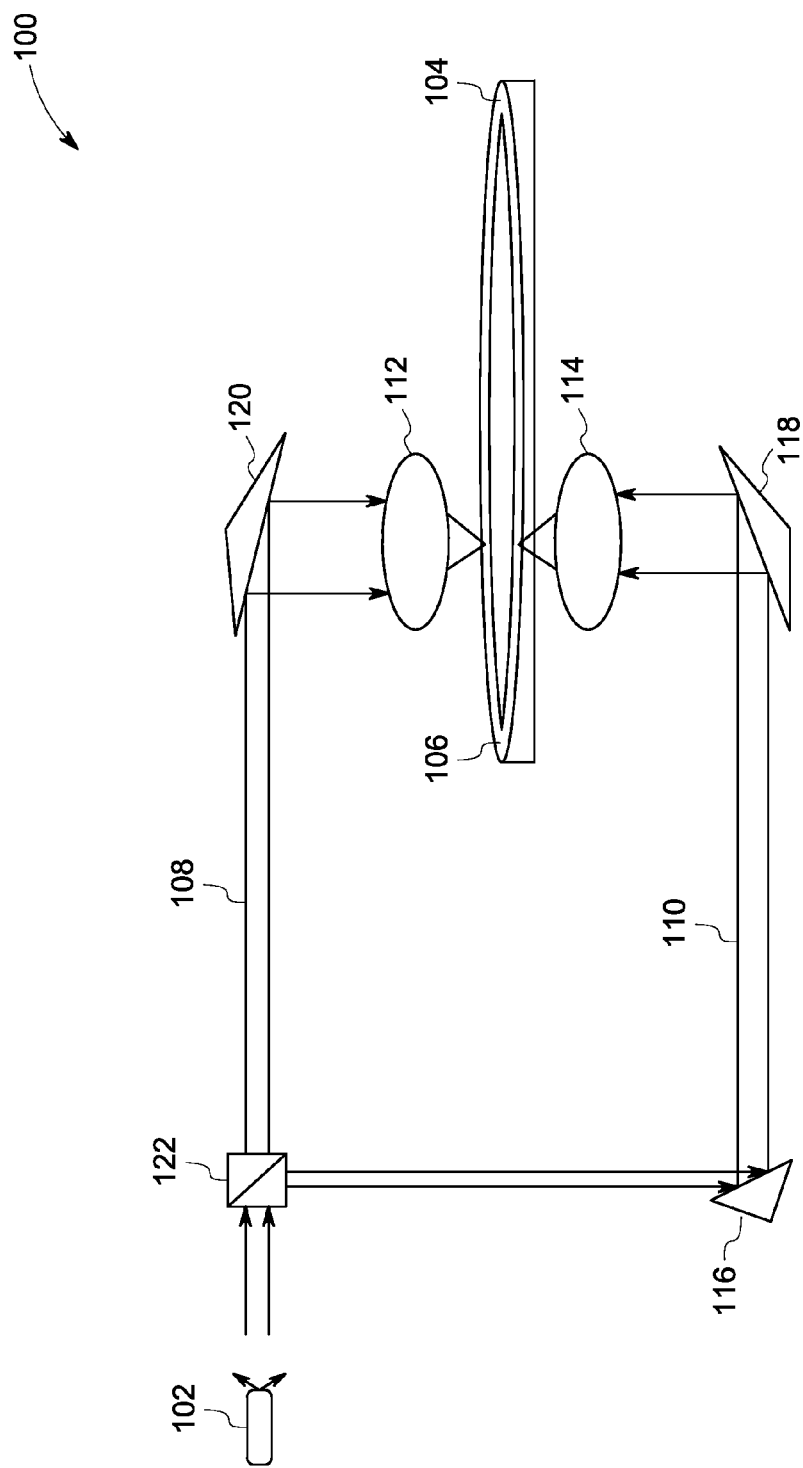
FIG. 1 is a schematic diagram of a preformatting system used for pre-formatting a micro-holographic storage medium used in accordance with an exemplary embodiment of the present invention.

FIG. 1 is a diagrammatic illustration of a double-sided optical preformatting system 100 employed to preformat a micro-holographic data storage medium 104. The micro-holographic data storage medium 104 has an information storage area 106 made up of a functional film fabricated using a photosensitive polymer material or any other material suitable for recording purposes. The functional material actively responds to preformatting laser light. Optical properties of the functional material are altered by the impinging laser light. The information area 106 extends from the outer edge of the storage medium 104 to an inner point in concentric or spiral tracks where data can be stored. In the illustrated embodiment, two laser beams 108, 110 are used to preformat the micro-holographic storage medium 104. A beam splitter 122 splits the beam from a laser source 102 into two beams 108 and 110. The optical elements 116, 118 and 120 may be used to generate the two counter propagating beams for pre-formatting. The optical elements 116, 118, 120 may include corner prims. The beams 108, 110 are focused to a particular depth of the information area 106 of the storage medium 104 via a first objective lens 112 and a second objective lens 114 respectively. The preformatting objective lenses 112 and 114 may have a first numerical aperture in the range of 0.2 to 0.6. Focal spots of the beams 108, 110 overlap at a particular depth of the storage medium 104 to create an interference pattern (also referred to as a "fringe pattern") in a relatively smaller region of the micro-holographic storage medium 104. The interference pattern produces a modulated refractive index pattern as a micro-hologram in the relatively smaller region of the micro-holographic storage medium 104.

Figure 2:
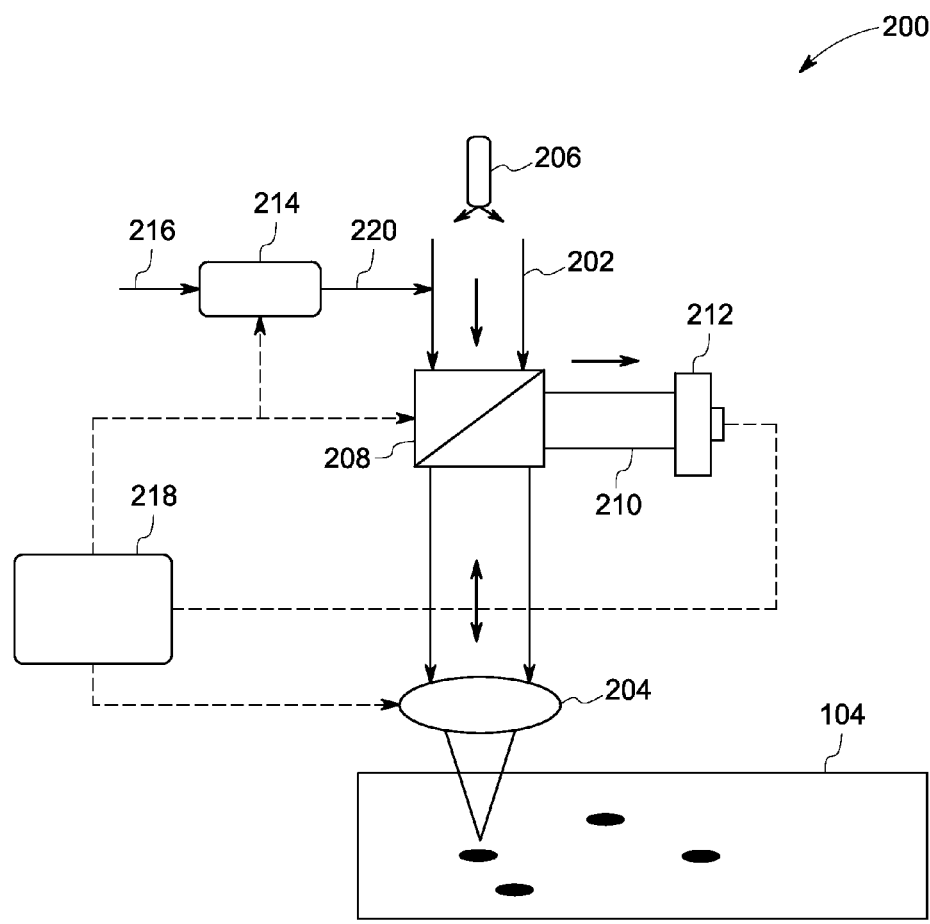
FIG. 2 is a schematic diagram of a recording system used for recording data in a preformatted micro-holographic storage medium used in accordance with an exemplary embodiment of the present invention.

FIG. 2 is a diagrammatic illustration of a data recording system 200 employed to record data in the preformatted micro-holographic data storage medium 104. A laser beam 202 from a laser source 206 is focused via a recording objective lens 204 to a particular depth in the micro-holographic storage medium 104. The laser beam 204 may be modulated based on an encoded data 220 representative of a "data marking scheme". The encoded data 220 is generated from a binary data 216 using a data encoding module 214. The laser beam 202 records the data in the pre-formatted micro-holographic storage medium 104. Recording may be done by modifying a fringe pattern of the micro-hologram track by focusing the laser beam 202 via the recording objective lens 204. The recording objective lens 204 has a second numerical aperture which is typically higher than the first numerical aperture of the preformatting system. Data recording system 200 may be controlled in various ways by a controller 218 while recording the data, based on the selected data marking scheme. In one embodiment, the laser power from the laser source 206 may be varied, via the controller 218. In another embodiment, movement of the data recording system 200 may be controlled in various directions using a suitable mechanical system, via the controller 218.

The controller 218 may include a general purpose processor, or a Digital Signal Processor (DSP) or any other form of processing unit. The controller 218 may receive additional inputs from a user through a control panel or any other input device such as a keyboard or a control panel. The controller may have an internal memory and may be capable of accessing external memory modules. The memory may be a random access memory (RAM), read only memory (ROM) or any other type of computer readable memory. The memory medium may be encoded with a program to instruct the controller 218 to enable a sequence of steps to record data in a micro-holographic storage medium 104.

The system 200 of FIG. 2 may also be used to read data from the recorded micro-holographic storage medium 104. In the illustrated embodiment, the laser beam 202, is focused at a particular depth of the storage medium 104 using a focusing optical element 204. The focusing optical element may be an objective lens including a single lens or a combination of lenses, mirrors, reflectors and other suitable optical elements. A portion of the light diffracted from the storage medium is received by a detector 212 through a beam splitter 208. The power of read light beam is smaller than power of the laser beam 202 used to record the data in the micro-holographic disc. The detector 212 may interpret the received signal based on a data marking scheme to derive the recorded data. The controller 218 may determine the configuration of focusing optics 204, beam splitter 208, detector 212, laser beam source 206 and related mechanical systems.

Figure 3:
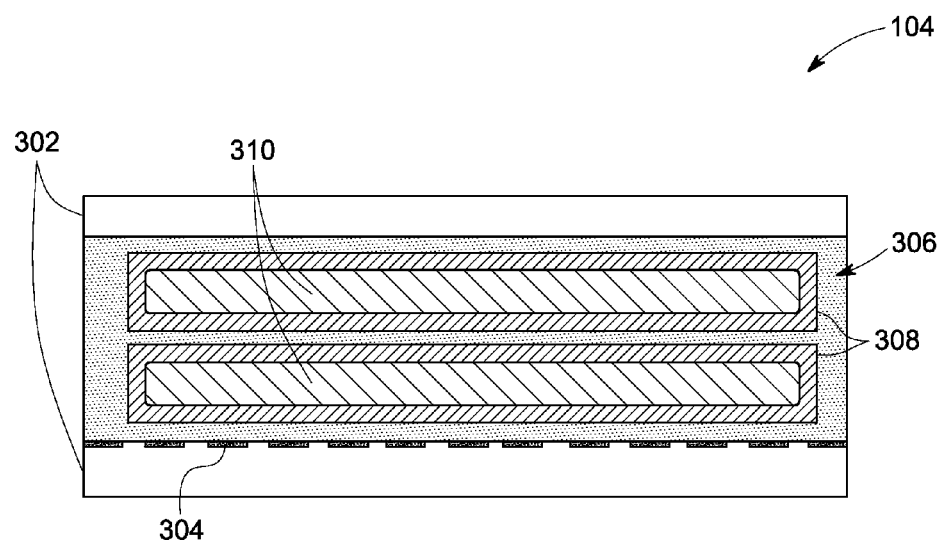
FIG. 3 is a schematic diagram of a structure of a micro-holographic storage medium in accordance with an exemplary embodiment of the present invention.

FIG. 3 is an illustration of the structure of the micro-holographic storage medium 104 of FIG. 1 in accordance with an exemplary embodiment of the present invention. In the illustrated embodiment, the storage medium 104 has two inert layers 302 and a functional film 306 disposed between the two inert layers 302. The inert layers 302 and the functional film 306 overlap each other. The storage medium 300 also includes a servo layer 304 which is recognized by a servo mechanism.

The preformatted micro-holographic storage medium, has at least one hologram track 308 formed in the functional film 306. The hologram track 308 having a first cross-sectional area is generated via the preformatting system of FIG. 1. In some embodiments, a plurality of hologram tracks 308 is formed at different levels in the functional film 306. The recorded micro-holographic storage medium has at least one data track 310 in each of the hologram track 308. Data track 310 having a second cross-sectional area is formed by recording data in the hologram track 308 via the data recording system 200 of FIG. 2. The second cross-sectional area of the data track 310 is smaller than the first cross-sectional area of the hologram track 308. The first cross-sectional area and the second cross-sectional area are referred with respect to a side view perpendicular to the direction of the hologram track.

Figure 4:
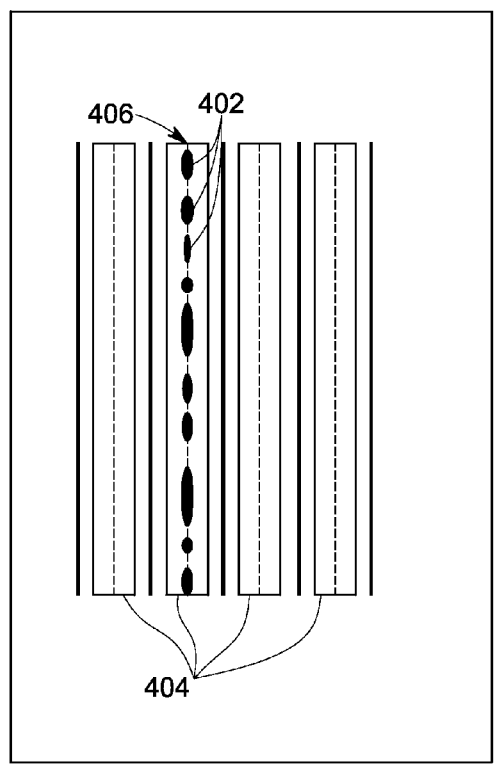
FIG. 4 is a top view of a plurality of pre-formatted hologram tracks and a data track formed in one hologram track in accordance with an exemplary embodiment of the present invention.

FIG. 4 is a schematic illustration of a top view of a micro-holographic storage medium 400. In the illustrated embodiment, a plurality of hologram tracks 404 are formed in the holographic storage medium 400. The size of the hologram track 404 formed in the storage medium 400 is dependent on the numerical aperture (NA) of the objective lens used in the pre-formatting system. According to an exemplary embodiment of the present invention, a preformatting system having an objective lens with a first numerical aperture in the range of 0.2 to 0.6 may be used to form hologram tracks 404. It should be noted herein that a preformatting objective lens with a relatively lower NA enable formation of hologram tracks of relatively larger size. Data may be recorded in each of the hologram tracks 404 in the form of a plurality of data markings 402 forming a data track 406.

Figure 5:
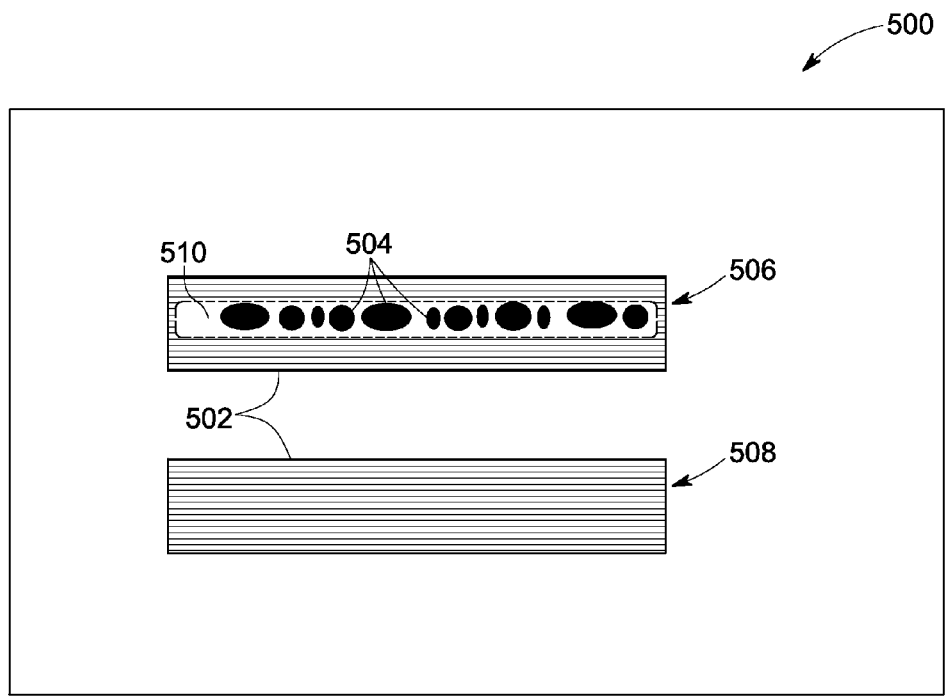
FIG. 5 is a side view of a plurality of hologram tracks formed at different levels of a micro-holographic storage medium and a data track formed in one hologram track in accordance with an exemplary embodiment of the present invention.

FIG. 5 is a schematic illustration of a side view of a micro-holographic storage medium 500 having a plurality of hologram tracks 502 formed at levels 506, 508. In the illustrated embodiment, data track 510 is formed by storing data as "modifications to micro-holograms" 504 within the hologram track 502 formed at the level 506. In certain embodiments, data recording may be performed using a data recording system having a recording objective lens with numerical aperture in the range of 0.8 to 0.9. Use of a recording objective lens with a relatively higher NA enables recording of micro-holograms of relatively smaller dimensions in the hologram track. The dimensions of a cross-section of the data markings 504 in the micro-holographic storage medium 500 is smaller than the dimensions of a cross-section of the hologram track.

Conventionally, the data is recorded in the form of binary data "zero" and "one". For example, to record a "zero" on the pre-formatted hologram disc with micro-holograms, an existing hologram is modified at a particular location. To record a 'one', the pre-populated micro-hologram is retained at another particular location. In accordance with the embodiments of the present invention, a recording system having an objective lens with relatively higher NA is used to record data in the hologram track. The cross-section of the data markings 504 is smaller in comparison to the cross-section of the hologram track 506. Data marks with relatively smaller cross-sectional area provides an opportunity to enhance the data density in the storage medium by recording more data in each hologram track. The data is recorded based on one or more predefined "data marking schemes". Data marking scheme is a scheme representative of storing the data in the hologram track of the pre-formatted micro-holographic storage medium. Various exemplary data marking schemes are discussed in detail with reference to subsequent figures.

It should be noted herein that the size of the laser induced altered region the holographic storage medium depends on the numerical aperture of the objective lens used to focus the laser in the storage medium while preformatting the storage medium and recording the data. For example, when a hologram track is created by the pre-formatting system or when a modification to the micro-hologram is formed by the recording system, local refractive index of the storage medium is altered. The transverse dimension of the altered region of the storage medium is inversely proportional to the numerical aperture of the objective lens focusing the laser beam. Similarly, along the axial direction, the dimension of the altered region of the storage medium is inversely proportional to square of the numerical aperture of the objective lens. In one embodiment, the data track has a width in the range of 0.2 microns to 0.4 microns. In another embodiment, the data track has a thickness in the range of 0.3 microns to 1 micron. In a particular embodiment, for example, an objective lens with a lower NA equal to 0.4 is used for pre-formatting in combination with an objective lens with a higher NA equal to 0.8 for data recording. Each hologram track may have two or more data tracks.

Figure 6:
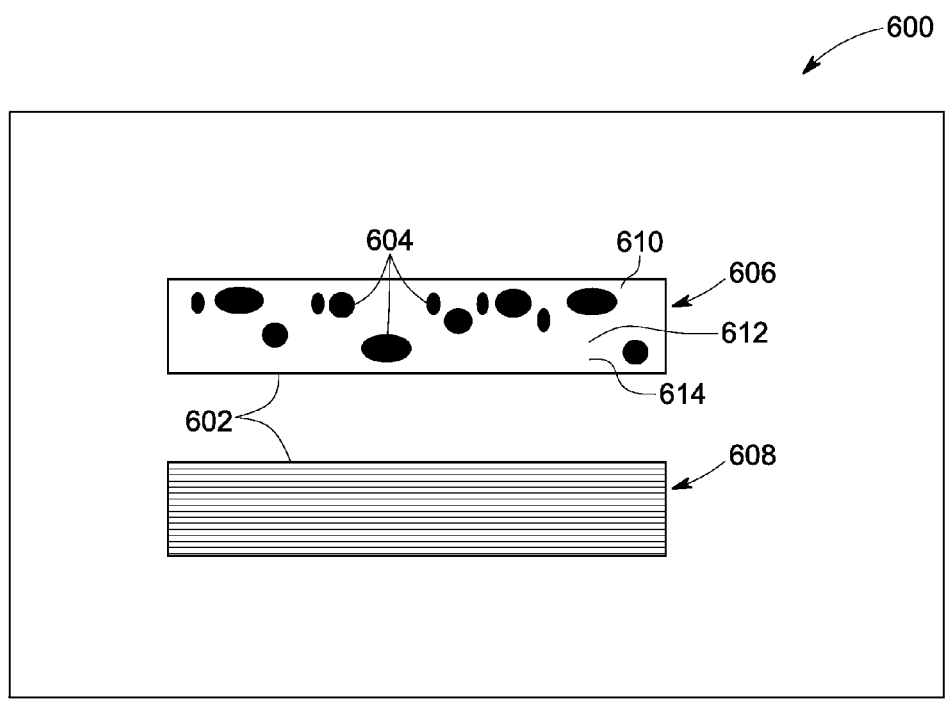
FIG. 6 illustrates a data marking scheme representative of a data recorded at a plurality of levels in a hologram track among a plurality of hologram tracks, in accordance with an exemplary embodiment of the present invention.

FIG. 6 is a schematic diagram of a side-view of a recorded holographic storage medium 600 having data recorded employing an exemplary embodiment of a data marking scheme. In the illustrated embodiment, the micro-holographic storage medium 600 has a plurality of hologram tracks 602 formed at levels 606, 608. In each of the hologram track 602, data 604 may be recorded at a plurality of levels 610, 612, 614 by focusing the laser beam to corresponding levels in the hologram track 602 using a suitable servo mechanism. Since the data recording is performed using the recording system having an objective lens with a relatively higher NA, a single hologram track 602 can accommodate larger quantity of data. Moreover, recording data at a plurality of levels 610, 612, 614 of the hologram track 602 enables efficient usage of the thickness of the hologram track 602.

Figure 7:
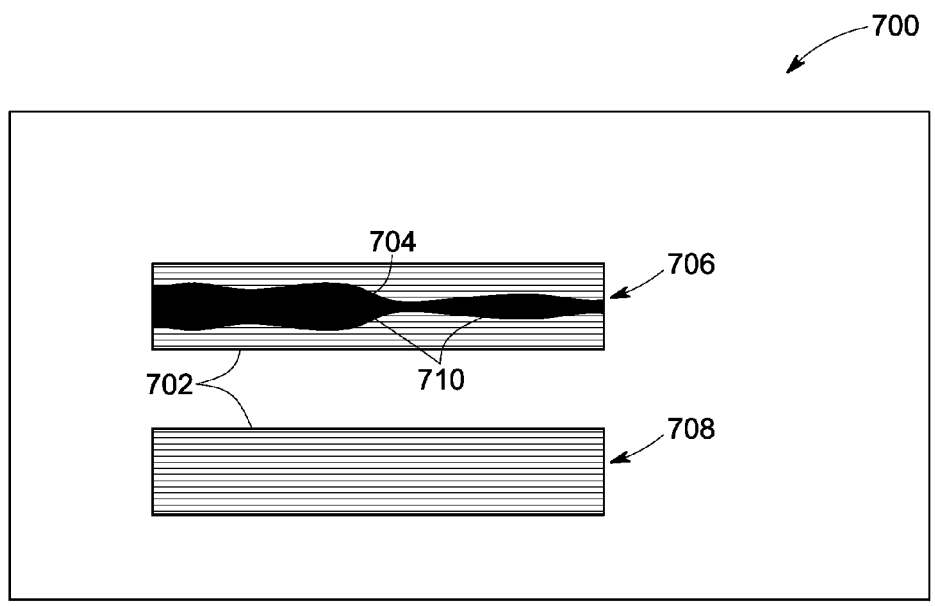
FIG. 7 illustrates a data marking scheme representative of data recorded in a hologram track among a plurality of hologram tracks, by employing a continuous amplitude modulation scheme in accordance with an exemplary embodiment of the present invention.

FIG. 7 is a schematic diagram of a side-view of a recorded holographic storage medium 700 having data recorded employing an exemplary embodiment of a data marking scheme. In the illustrated embodiment, the micro-holographic storage medium 700 has a plurality of hologram tracks 702 formed at different levels 706, 708. In certain embodiments, data may be recorded by altering the properties of the functional material of the hologram track 702 by means of a modulation scheme. The modulation employed may be a continuous modulation scheme. A laser beam is used to alter the characteristic of the hologram track 702 in a continuous manner. The laser beam used to modify the characteristic of the hologram track 702 may be modulated based on the data to be recorded. The continuous modulation schemes may include amplitude modulation or depth modulation. In the illustrated embodiment, the laser beam may be used to alter the optical characteristics of the hologram track 702 at level 706, along an axial direction in a continuous manner to form a data track 704. The data track 704 has varying thickness and the magnitude of the thickness is representative of the data recorded in the hologram track 702.

Figure 8:
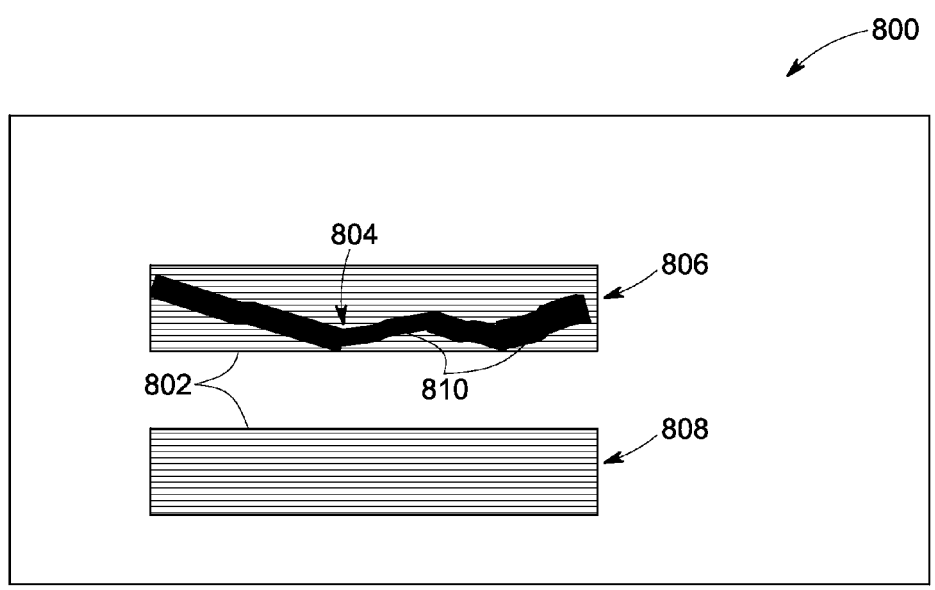
FIG. 8 illustrates a data marking scheme representative of data recorded in a hologram track among a plurality of hologram tracks, by employing a continuous amplitude and depth modulation scheme in accordance with an exemplary embodiment of the present invention.

FIG. 8 is a schematic diagram of a side-view of a recorded holographic storage medium 800 having data recorded employing an exemplary embodiment of a data marking scheme. The micro-holographic storage medium 800 has a plurality of hologram tracks 802 formed at different levels 806, 808. In the illustrated embodiment, the data is recorded in the storage medium 800 by altering the characteristics of the hologram track 802 at level 806 at different depths in a continuous manner. In some embodiments, a combination of modulation schemes for recording the data is utilized. In the illustrated exemplary embodiment, an amplitude modulation is combined with depth modulation to form a data track 804 in the hologram track 802 at level 806. The data track 804 has varying thickness and depth. In alternate exemplary embodiments, modulations schemes may be used to record non-binary data. The non-binary data is represented by a series of symbols with each symbol represented by a plurality of bits. The symbols of the data may be embedded at different depths of the data track.

Figure 9:
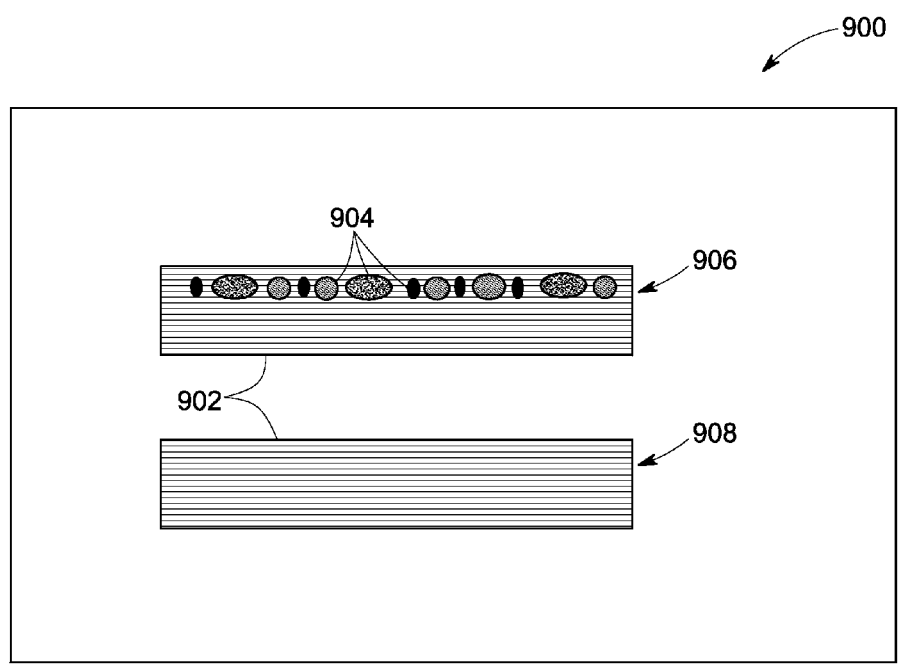
FIG. 9 illustrates a data marking scheme representative of non-binary data stored in a hologram track among a plurality of hologram tracks, in accordance with an exemplary embodiment of the present invention.

FIG. 9 is a schematic diagram of a side-view of a recorded holographic storage medium 900 having data recorded employing an exemplary embodiment of a data marking scheme. The micro-holographic storage medium 900 includes a plurality of hologram tracks 902 formed at a plurality of levels 906, 908. In this embodiment, the data may be recorded by altering the optical characteristics of the hologram track 902 to a different extent. The thickness of the data track or the depth of the data track in the hologram track 902 may not vary. The fringe pattern of the hologram track 902 at level 906 may be locally erased to a different extent to record a plurality of data markings 904 storing data samples. Different shades of data markings 904 recorded in a hologram track 902 at level 906 may represent different levels of a non-binary data. Combinations of erasure techniques of the above embodiments are also envisioned in alternate embodiments.

Figure 10:
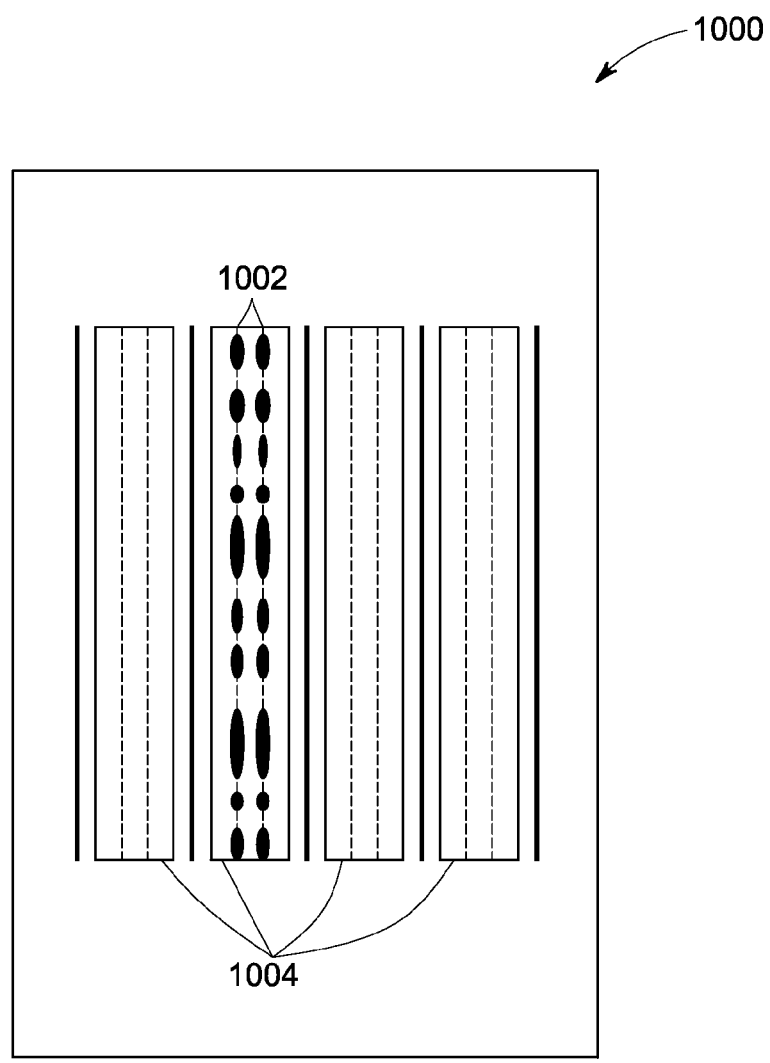
FIG. 10 illustrates a data marking scheme representative of a plurality of data tracks formed in a hologram track among a plurality of hologram tracks, in accordance with an exemplary embodiment of the present invention.

FIG. 10 illustrates the top view 1000 of the micro-holographic storage medium with a plurality of data tracks 1002 in accordance with an exemplary embodiment of a data marking scheme. In the illustrated embodiment, two data tracks 1002 are formed in one hologram track 1004 among a plurality of hologram tracks 1004 formed in a functional film. Each of the data tracks 1002 can be formed by recording data employing any of the previously discussed data marking schemes or combinations thereof. In some such embodiments, a plurality of laser sources may be used to record (or read) data to (or from) a preformatted (a recorded) micro-holographic storage medium.

FIG. 11 illustrates the top view of a recorded micro-holographic storage medium 1100 having data recorded in accordance with an exemplary data marking scheme. The recorded holographic storage medium 1100 has a plurality of hologram tracks 1102 formed in a functional film. Each hologram track 1102 has two data tracks 1104 disposed adjacent to each other. In the illustrated embodiment, in one of the hologram track 1102, the trajectory of the data track 1104 is modulated with reference to a linear trajectory 1106. It should be noted herein that additional information may be encoded in the exemplary modulated data track 1104. Typically, smaller amounts of information, such as timing or positional information may be stored by employing such a data marking scheme.

FIG. 12 illustrates a recorded micro-holographic storage medium 1200 having meta-data recorded in accordance with an exemplary data marking scheme. The recorded micro-holographic storage medium 1200 has a plurality of hologram tracks 1202 formed at levels 1206 and 1210. In the illustrated embodiment, a meta-data 1208 is stored at a predetermined depth in the hologram track 1202. The meta-data 1208 may include timing or positional information or any other information related to identification, and usage of the data stored on the storage medium 1200. In the illustrated embodiment, the meta-data 1208 is stored along with other types of data 1204 within the same hologram track 1202 at level 1206.

Recording data employing various embodiments of data marking schemes on a micro-holographic storage medium involve different requirements. Typically, the recording method first involves encoding of data suitable for a particular data marking scheme. Data recording system and corresponding data retrieval mechanisms corresponding to a particular data marking scheme may have specific system requirements. For example, in some recording methods, recording laser may have to be modulated. In other embodiments of recording, suitable servo control mechanism in combination with controlling focusing optics in a unique way may be required. Partial erasure of fringe pattern in a hologram track or varying the cross-section of the erased fringe pattern may need additional control mechanisms in the recording system. The same data recording system may support one or more embodiments of exemplary data marking schemes.

Disclosed embodiments of the present invention enable simpler pre-formatting system in combination with low cost backward compatible single-side drive for recording/reading of data. Proposed embodiments of recording techniques enhance data density in a storage medium preformatted using an objective lens having lower NA. Use of larger size hologram tracks in combination with smaller size data tracks provides relatively more freedom to design the holographic storage medium.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A method implemented using a data recording system, the method comprising:
   receiving a micro-holographic data storage medium comprising a micro-hologram track having a first cross-sectional area;
   recording a data in the micro-hologram track to form a data track in the micro-hologram track having a second cross-sectional area smaller than the first cross-sectional area; and
   selecting at least one data marking scheme among a plurality of data marking schemes for recording the data on the micro-hologram track.

2. The method of claim 1, wherein the at least one data marking scheme comprises a scheme representative of storing the data at a plurality of levels in the micro-hologram track.

3. The method of claim 1, wherein the at least one data marking scheme comprises a scheme representative of storing the data in the micro-hologram track by forming the data track having a modulated trajectory.

4. The method of claim 1, wherein the at least one data marking scheme comprises a scheme representative of storing the data by employing a continuous modulation scheme.

5. The method of claim 4, wherein employing the continuous modulation scheme comprises employing at least one of an amplitude modulation scheme, and a depth modulation scheme.

6. The method of claim 1, wherein the at least one data marking scheme comprises a scheme representative of storing the data comprising a non-binary data in the micro-hologram track.

7. The method of claim 1, wherein the at least one data marking scheme comprises a scheme representative of storing the data comprising a meta-data in the micro-hologram track.

8. The method of claim 1, wherein the at least one data marking scheme comprises a scheme representative of storing the data in the micro-hologram track by forming the data track comprising a plurality of data tracks in the micro-hologram track.

9. The method of claim 1, wherein recording the data in the micro-hologram track comprises controlling the data recording system based on the selected data marking scheme.

10. The method of claim 9, wherein controlling the data recording system comprises controlling at least one of a laser power from a laser source and movement of the data recording system.

11. The method of claim 1, wherein the micro-hologram track is formed by preformatting the micro-holographic data storage medium, using a pre-formatting system comprising a preformatting objective lens with a first numerical aperture.

12. The method of claim 11, wherein the first numerical aperture is in the range of 0.2 to 0.6.

13. The method of claim 11, wherein recording the data comprises modifying a fringe pattern of the micro-hologram track via the data recording system comprising a recording objective lens with a second numerical aperture which is greater than the first numerical aperture.

14. The method of claim 13 wherein the second numerical aperture is in the range of 0.8 to 0.9.

15. A micro-holographic data storage medium, comprising:
- an inert layer;
- a functional film disposed overlapping the inert layer;
- a micro-hologram track having a first cross-sectional area formed in the functional film;
- a data track having a second cross-sectional area smaller than the first cross-sectional area formed in the micro-hologram track;
- wherein the data track comprises a data stored at a plurality of levels in the micro-hologram track.

16. The micro-holographic data storage medium of claim 15, wherein the data track has a modulated trajectory.

17. The micro-holographic data storage medium of claim 15, wherein the data track comprises a continuous data track in the micro-hologram track.

18. The micro-holographic data storage medium of claim 17, wherein the continuous data track comprises a data modulated based on at least one of an amplitude modulation scheme, and a depth modulation scheme.

19. The micro-holographic data storage medium of claim 15, wherein the data track comprises a non-binary data stored in the micro-hologram track.

20. The micro-holographic data storage medium of claim 15, wherein the data track comprises a meta-data stored in the micro-hologram track.

21. The micro-holographic data storage medium of claim 15, wherein the data track comprises a plurality of data tracks formed in the micro-hologram track.

22. The micro-holographic data storage medium of claim 15, wherein the micro-hologram track is formed by preformatting the micro-holographic data storage medium, using a preformatting system comprising a preformatting objective lens with a first numerical aperture.

23. The micro-holographic data storage medium of claim 22, wherein the data track is formed by recording a data in the micro-hologram track, using a data recording system having a recording objective lens with a second numerical aperture which is greater than the first numerical aperture.

24. The micro-holographic data storage medium of claim 15, wherein the data track has a width in the range of 0.2 microns to 0.4 microns.

25. The micro-holographic data storage medium of claim 15, wherein the data track has a thickness in the range of 0.3 microns to 1 micron.

26. A non-transitory computer readable medium encoded with a program to instruct a processing unit to:
- record a data in a micro-hologram track of a micro-holographic storage medium to form a data track in the micro-hologram track;
- wherein the micro-hologram track has a first cross-sectional area and the data track has a second cross-sectional area smaller than the first cross-sectional area; and
- wherein at least one data marking scheme among a plurality of data marking schemes for recording the data on the micro-hologram track is selected.

* * * * *